May 26, 1953  A. B. SOWTER  2,639,634
APPARATUS FOR COLD WELDING OF METAL
Filed April 12, 1949
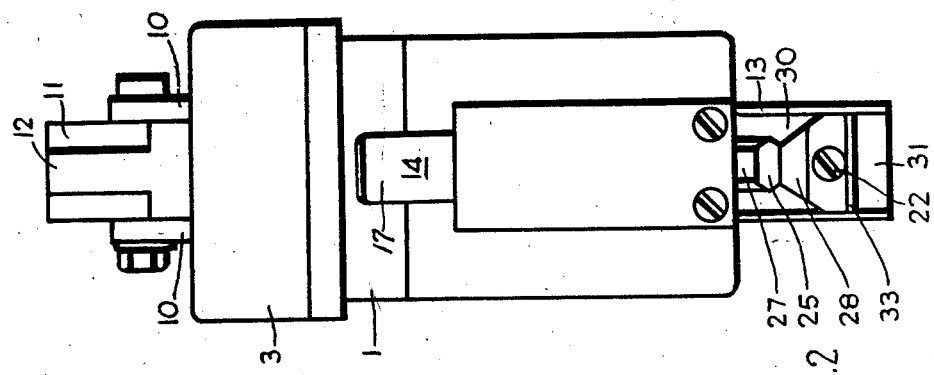
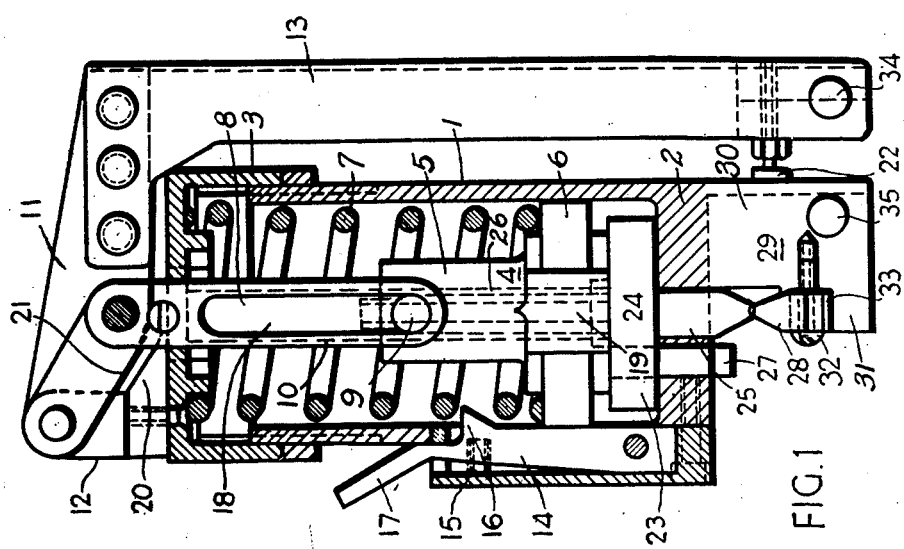
INVENTOR
ANTHONY BAGNOLD SOWTER
BY
ATTORNEY Patented May 26, 1953

2,639,634

UNITED STATES PATENT OFFICE 2,639,634

APPARATUS FOR COLD WELDING OF METAL

Anthony Bagnold Sowter, Wembley, England, assignor to The General Electric Company, Limited, London, England Application April 12, 1949, Serial No. 86,929
In Great Britain April 23, 1948

3 Claims. (Cl. 78—82)

This invention relates to apparatus for cold pressure welding of metal such as aluminium, copper or other ductile and non-ferrous metal or metal alloy, i. e. welding essentially by mechanical pressure without supply of any substantial amount of external heat.

Recently, the use of cold pressure welding, particularly of aluminium and aluminium alloys, has been increasing in extent and several different methods and forms of apparatus have been proposed for effecting welding. Thus, it has been proposed to weld the seam of an aluminium sheath of an electric cable by a cold pressure welding method.

In the past, the apparatus for effecting cold pressure welding has usually been of what might be called the "static" type. For example, for seam welding of an aluminium cable sheath, apparatus including bending and pressure rolls together with a driving motor is required and, in the case of welding two flanged aluminium or copper caps together, a heavy press is used.

Now there are certain applications of cold pressure welding where, in effect, the welding apparatus must be taken to the job rather than the job being taken to the apparatus and one particular example of this is the case of welding together the aluminium or copper strands of two stranded high tension overhead cables which are to be connected together. Obviously, in a case like this, it is difficult to transport a heavy press over the countryside say to perform such a task on the ground and, where the welding is to be effected in the length of cable connecting two insulator strings on a pylon, the use of a heavy press is ruled out.

One object of the present invention, therefore, is the provision of a method of and apparatus for effecting cold pressure welding which are particularly applicable to cases of the nature outlined above.

According to one aspect of the present invention, in a method of welding together two metallic surfaces capable of being cold pressure welded, the pressure required for effecting cold pressure welding of the surfaces together is obtained by the release of stored energy.

The present invention includes a method of welding together two metallic surfaces capable of being cold pressure welded wherein welding is effected by impact pressure.

According to another aspect of the present invention, apparatus for welding together two metallic surfaces capable of being cold pressure welded comprises energy storage means and a welding tool or tools associated with the said means and arranged to receive energy released from the said means to effect welding of the said surfaces by impact pressure.

The apparatus may suitably include a spring in which kinetic energy is arranged to be stored, a pair of co-operating tools between which say a pair of flattened aluminium strands of an overhead cable may be placed, and tripping or release means arranged to allow the stored energy to drive one tool towards the other to effect welding.

Such apparatus can be made portable in the true sense like a hammer, screw-driver, etc., and a lever mounted on the apparatus may be used for stressing the spring. Preferably, the spring is compressed and is allowed to expand to give the necessary impact pressure.

A portable impact pressure welding apparatus in accordance with the present invention and for joining together lengths of stranded aluminium overhead cable will now be described by way of example with reference to the accompanying drawing in which Figure 1 shows a side view of the apparatus partly sectioned in a plane containing its axis and Figure 2 shows a front view of the apparatus.

Referring now to the drawing, the apparatus comprises a hollow cylindrical body 1 of mild steel, circular in section, having one end closed by an end member 2 formed in one with the body 1 and the other end closed by a cap 3 which screws onto the threaded upper end of the outside of the cylindrical body 1. Mounted within the body 1 is a mushroom shaped hammer 4 of unhardened cast steel, the stem 5 of the hammer 4 projecting from the head 6 towards the screwed cap 3, and a heavy coiled compression or storage spring 7 acts between the cap 3 and the rear surface of the hammer head 6, the spring 7 being of slightly smaller diameter than the bore of the body 1.

The hammer 4 is arranged to be moved in the bore against the force of the spring 7 and is guided in this movement by a central rod 8 carried by the screw cap 3 which slides in a bore in the hammer stem 5. Actually, as will be appreciated from description that follows, the hammer bore passes right through the stem 5 and head 6. To move the hammer 4, the stem 5 is provided towards its free end with two side studs 9 (only one being visible on Figure 1), diametrically opposite one another, and these co-operate with a pair of parallel slotted links 10 which lie one each side of the stem 5 parallel to the body and stem axes and pass through suitable apertures in the cap 3.

The links 10, at their ends outside the body bore, are pivoted to a solid arm 11 of mild steel pivoted at one end in an upstanding pillar 12 on the cap 3, the pivoted axis of the arm 11 being perpendicular to the axis of the body 1 and spaced away from the body axis. The other end of the arm 11 is provided with a channel shaped member or lever 13 of mild steel sheet which runs towards the other end of the body 1 and, when in its normal position, is more or less parallel to the body axis. Movement of the lever 13 away from the body 1 rotates the arm 11 about its pivot, pulls the pair of links 10 through the cap 3 and raises the hammer 4 against the force of the coiled compression spring 7.

In order to retain the hammer 4 in its raised position, a side latch 14 is provided on the body 1 and when the hammer 4 moves past the latch 14, it moves in under the force of a spring 15 to retain the hammer 4 in its raised position by a portion 16 engaging under the head 6. The latch 14 is provided with a finger release 17 and, once the hammer 4 is latched, the arm 11 and lever 13 may adopt their original positions, the side studs 9 on the hammer stem 5 passing along the slots 18 in the pair of links 10 and the inner ends of the links 10 finally riding over flats 19 (only one being visible in Figure 1) on the hammer head 6.

The arm 11 mounted on the cap 3 is used for pre-flattening the strands of the cable and, for this purpose, the pillar 12 is provided with a flat sloping surface 20 which co-operates with a flat surface 21 formed on the underside of the arm 11. A strand would be placed between the surfaces 20 and 21 with the arm 11 raised slightly and then the lever 13 pressed towards the body 1 to flatten the strand to the required extent. The final gap between the surfaces 20 and 21 is controlled by an adjustable stop 22 mounted on the free end of the lever 13 and bearing against the side of the body 1.

Mounted between the head 6 of the hammer 4 and solid closed end 2 of the body 1 is the head 23 of a mushroom shaped member 24, in effect, a striker or first welding tool, the stem 25 of which passes with a sliding fit through an aperture in the solid closed end 2. The striker 24 is biased away from the hammer 4 or towards the cooperating welding tool 28 by a coiled compression spring 26 mounted in the bore of the hammer 4, referred to above, and, when the hammer 4 is raised, the striker 24 can be moved against this spring 26 by a pin 27 in the head 23 of the striker 24 which pin 27 passes, parallel to the striker stem 25, through another hole in the solid closed end 2 of the body 1.

The striker 24 is also made of unhardened cast steel and the free end of its stem 25 is tapered and finishes in a flat rectangular end surface whose width is approximately the width of a flattened strand and whose length is that of the required weld length. The stem 25 of the striker 24 forms, in effect, a die or one welding tool and the anvil or other welding tool 28 which co-operates with it is secured to an L-shaped projection 29 formed in one with the solid closed end 2 of the body 1. The long arm 30 of the L is parallel to the body axis and the short arm 31 perpendicular to the axis, the anvil 28, also of unhardened cast steel, being secured by a screw 32 to the long arm 30 and resting its end remote from the striker 24, with the interposition of a replaceable shim 33, against the short arm 30. The end surface of the anvil 28 is formed exactly the same as the end surface of the die or stem 25 and the two strands to be cold welded together are placed between the die and the anvil, one on the other. Movement of the striker 24 towards the anvil 28 is limited by the striker or die head 23 engaging the inner face of the solid closed end 2 of the body 1 and the shim 33 associated with the anvil 28 controls the percentage reduction of thickness obtained during welding. If desired, the tools may be shouldered as described in my Patent No. 2,522,408, granted on application Serial No. 123,315, filed October 25, 1949, which was filed as a continuation-in-part of my prior application Serial No. 86,930, filed April 12, 1949, now abandoned.

In operation of the apparatus described above, when it is required to join together the separate strands of two cable lengths, each pair of strands is welded separately. To weld a pair together, the lever 13 is first operated to compress the main spring 7 and the hammer 4 is latched in its raised position. Then, each strand is flattened in the device associated with the lever 13 and the striker 24 raised against its biasing spring 26 to allow the two flattened strands, after scratch-brushing, to be placed one on the other and in line between the end surfaces of the die and anvil 25 and 28. The striker 24 is released so that the spring 26 maintains the strands correctly positioned and then the latch 14 is tripped to allow the main compression spring 7 to drive the hammer 4 down onto the striker 24 to effect the cold pressure weld of the two strands together. The inner face of the solid closed end 2 of the body 1 absorbs the residual impact after the correct percentage reduction has been obtained and, to remove the welded strands, the lever 13 is eased away from the body 1.

The free end of the lever 13 and the L-shaped projection 29 on the solid closed end 2 of the body 1 are provided with transverse holes 34 and 35 respectively for tommy bars (not shown) to facilitate raising of the hammer 4.

Instead of compressing the spring manually as described above, it may be done hydraulically or pneumatically either from some external pressure supply or by hand operation.

For cold pressure welding strips of thin aluminium sheet together, "spot" welds using an automatic centre punch with a suitably shaped end co-operating with a flat anvil, may be used.

Instead of using energy stored in a spring for effecting welding, energy stored in a raised weight, in a compressed gas or in an explosive charge may be used. Thus, a cartridge may be fired to produce the necessary impact pressure.

I claim:

1. A pressure welding tool comprising a support, an anvil fixedly mounted on said support, a die for cooperating with said anvil in effecting a weld between two metal parts, means mounting the die with relation to said support for movement to and from said anvil, a hammer mounted upon said support for movement to and from said die, energy storage and release means at the side of the hammer remote from the die for causing the hammer to impart an impacting welding pressure upon the die, means for moving the hammer away from the die and simultaneously storing energy in said energy storage and release means, and means independent of said energy storage and release means continuously effective to bias the die towards the anvil so that when parts to be welded are placed between the anvil and the die in proper welding position, the biasing of the die towards the anvil will hold the parts in said position.

2. A pressure welding tool as defined in claim 1 in which the hammer is slidably mounted on said support, the energy storage and release means is a coiled compression spring, and which includes means effective upon movement of the hammer a predetermined distance away from the die for releasably holding the hammer away from the die against the force of the energy stored in said spring.

3. A pressure welding tool as defined in claim 2 including means for limiting the extent of the movement of the die towards the anvil, whereby during a welding operation, the percentage of reduction of the parts under the impacting force of the hammer may be controlled.

ANTHONY BAGNOLD SOWTER.

References Cited in the file of this patent

UNITED STATES PATENTS

| Number | Name | Date |
|---|---|---|
| 1,465,918 | Redinger | Aug. 21, 1923 |
| 2,364,420 | Bloss | Dec. 5, 1944 |
| 2,427,597 | Garner | Sept. 16, 1947 |
| 2,475,398 | Montoya | July 5, 1949 |
| 2,522,408 | Sowter | Sept. 12, 1950 |